(12) United States Patent
Gordon et al.

(10) Patent No.: US 10,622,792 B2
(45) Date of Patent: Apr. 14, 2020

(54) CABLE GUARD CABLE RAMP OR CABLE PROTECTOR

(71) Applicant: TEN 47 LIMITED, Dysart, Kirkcaldy (GB)

(72) Inventors: Keith Forbes Gordon, Kirkcaldy (GB); Ronnie Anderson, Kirkcaldy (GB); Radoslav Hudec, Kirkcaldy (GB)

(73) Assignee: TEN 47 LIMITED, Dysart, Kirkcaldy (GB)

( * ) Notice: Subject to any disclaimer, the term of this patent is extended or adjusted under 35 U.S.C. 154(b) by 0 days.

(21) Appl. No.: 15/505,177

(22) PCT Filed: Aug. 20, 2015

(86) PCT No.: PCT/GB2015/000250
§ 371 (c)(1),
(2) Date: Feb. 20, 2017

(87) PCT Pub. No.: WO2016/027053
PCT Pub. Date: Feb. 25, 2016

(65) Prior Publication Data
US 2017/0279255 A1    Sep. 28, 2017

(30) Foreign Application Priority Data

Aug. 20, 2014  (GB) .................................. 1414773.0

(51) Int. Cl.
*F16L 3/22*       (2006.01)
*H02G 3/04*      (2006.01)
(Continued)

(52) U.S. Cl.
CPC .......... *H02G 3/0437* (2013.01); *F16L 3/2235* (2013.01); *F16L 3/26* (2013.01);
(Continued)

(58) Field of Classification Search
CPC .......... F16B 5/0635; F16B 2/12; G09F 15/02; H02G 3/0437; H02G 9/04; F16L 3/2235; F16L 3/26; F16M 11/22
(Continued)

(56) References Cited

U.S. PATENT DOCUMENTS 585,540 A * 6/1897 Spangler
4,347,998 A * 9/1982 Loree ................... F16L 3/2235
                                                     138/115
(Continued)

FOREIGN PATENT DOCUMENTS

DE        8915226 U1    1/1991
DE        20007272 U1   8/2001
(Continued)

OTHER PUBLICATIONS

International Preliminary Report on Patentability, International Application No. PCT/GB2015/000250, dated Feb. 21, 2017.
(Continued)

*Primary Examiner* — Gwendolyn W Baxter
(74) *Attorney, Agent, or Firm* — Marshall, Gerstein & Borun LLP; Randall G. Reuth

(57) ABSTRACT

A cable guard suitable for the prevention of cable. The cable guard has a housing adapted to receive one or more length of cable, a cover connected to the housing, the cover allowing access to the housing for placing the cable in the housing and a locking mechanism for securing the length of cable inside the housing.

15 Claims, 6 Drawing Sheets

(51) Int. Cl.
   *H02G 9/04* (2006.01)
   *F16L 3/223* (2006.01)
   *F16L 3/26* (2006.01)
   *F16M 11/22* (2006.01)

(52) U.S. Cl.
   CPC ........... *F16M 11/22* (2013.01); *H02G 3/0487* (2013.01); *H02G 9/04* (2013.01); *F16M 2200/08* (2013.01)

(58) Field of Classification Search
   USPC .......... 248/68.1, 551; 14/69.5; 174/68.1, 97, 174/101
   See application file for complete search history.

(56) References Cited

U.S. PATENT DOCUMENTS

| | | | | |
|---|---|---|---|---|
| 5,095,822 | A * | 3/1992 | Martin | H02G 9/04 104/275 |
| 6,481,036 | B1 * | 11/2002 | Duvall | H02G 9/02 104/275 |
| 6,747,212 | B1 * | 6/2004 | Henry | H02G 3/283 104/275 |
| 7,145,079 | B1 * | 12/2006 | Henry | H02G 3/0418 174/101 |
| 7,810,197 | B1 * | 10/2010 | Anthony | F16L 3/2235 14/69.5 |
| 8,001,643 | B1 * | 8/2011 | James | F16L 3/23 14/69.5 |
| 2007/0095561 | A1 | 5/2007 | Lubanski | |
| 2010/0224388 | A1 * | 9/2010 | Lubanski | F16L 57/00 174/97 |
| 2014/0041936 | A1 * | 2/2014 | Coffman | H02G 9/04 174/74 R |
| 2014/0326478 | A1 * | 11/2014 | Maioli | H02G 3/0608 174/24 |
| 2018/0278033 | A1 * | 9/2018 | Yamao | B60R 16/0215 |

FOREIGN PATENT DOCUMENTS

| | | |
|---|---|---|
| EP | 0409806 A2 | 1/1991 |
| FR | 2749914 A1 | 12/1997 |
| NL | 1010168 C2 | 3/2000 |

OTHER PUBLICATIONS

International Search Report and Written Opinion, International Application No. PCT/GB2015/000250, dated Nov. 26, 2015.

* cited by examiner

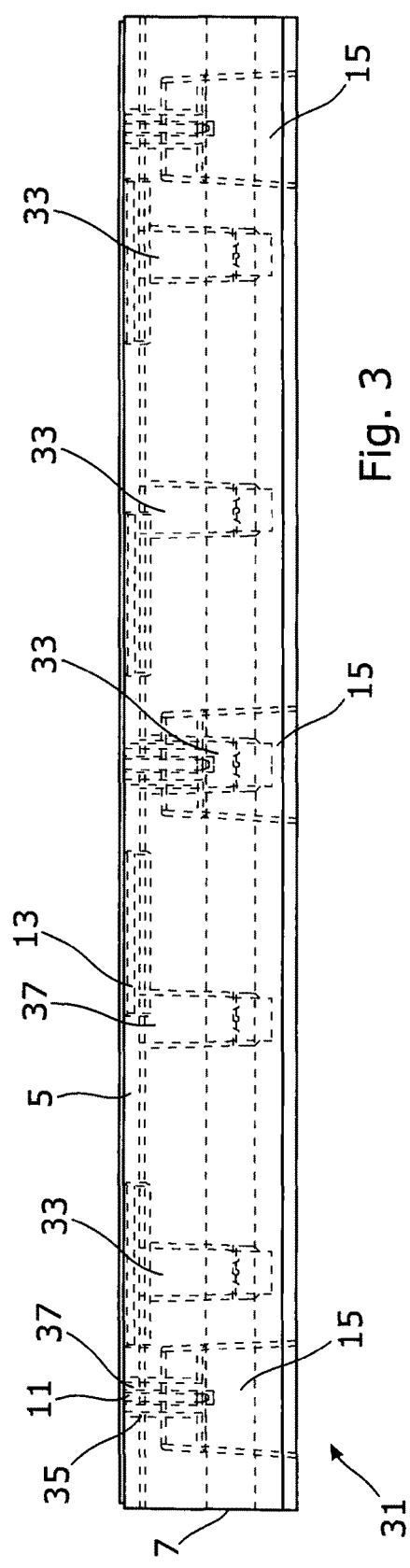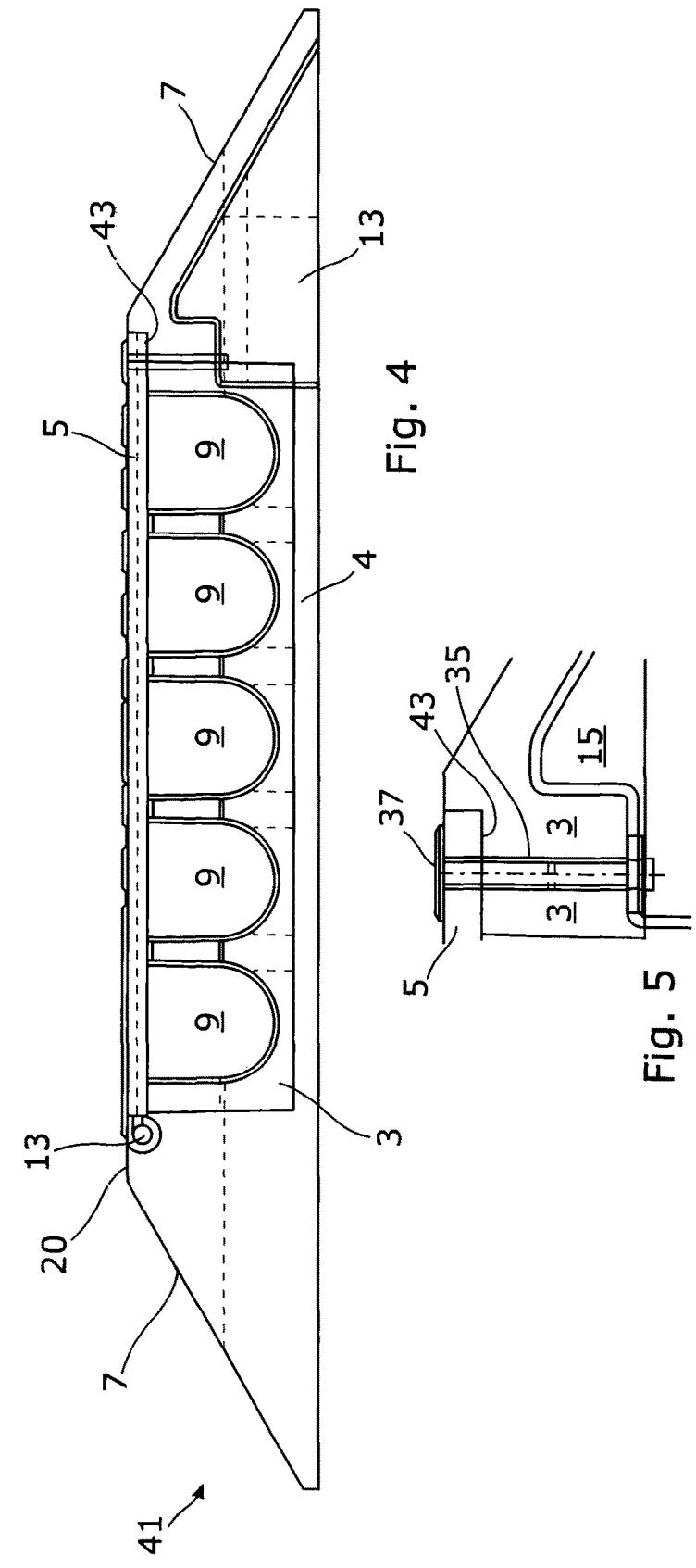

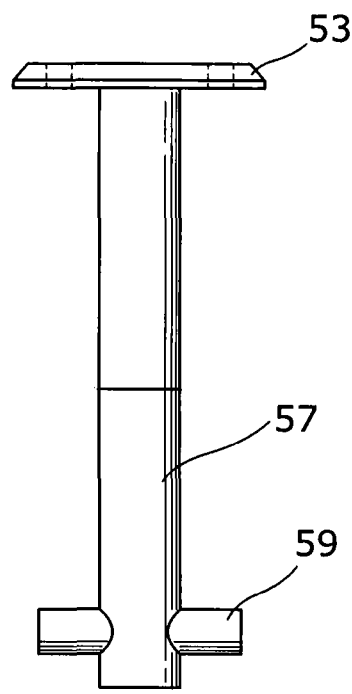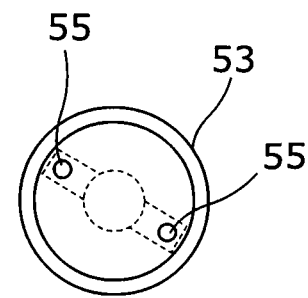
Fig. 6a
Fig. 6b
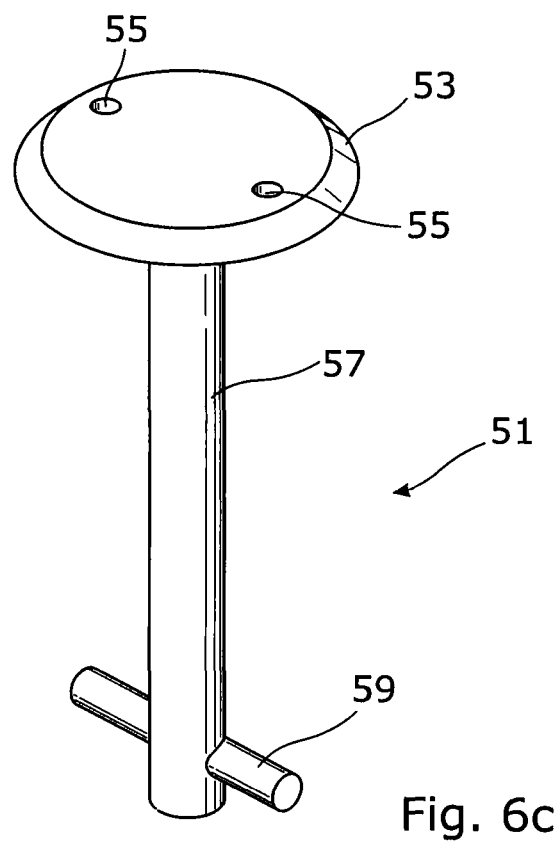
Fig. 6c

CABLE GUARD CABLE RAMP OR CABLE PROTECTOR

CROSS-REFERENCE TO RELATED APPLICATIONS

This application is the U.S. National Phase of PCT/GB2015/000250, filed Aug. 20, 2015, which claims the benefit of UK Application No. 1414773.0, filed Aug. 20, 2014, the entire respective disclosures of which are incorporated herein by reference.

The present invention relates to an apparatus for protecting and concealing cables known as a cable guard, cable ramp or cable protector.

BACKGROUND TO THE INVENTION

Outdoor events such as concerts, golf tournaments, exhibitions and the like often require electrical power to be provided to temporary structures such as stages and marquees from either a mains power source or a generator. Power is transmitted via heavy duty cables from the power source to an electrical load such as lighting, a public address system, heating and cooling systems. In most cases, the heavy duty cables are placed on top of the ground and in some locations the cables will cross walkways and roads. It is particularly important that the cables are protected from the weight of vehicles crossing over the cables and that the cables are not a trip hazard.

In general a cable guard is a device which covers or encloses a length of cable and is made of a suitably robust material. One typical type comprises a cover shaped to fit over a cable and having flanged sides which may be secured to the ground. Another type comprises a housing which contains one or more u-shaped channels which are designed to accommodate a length of cable. A flat cover extends over the u-shaped channels and in some cases the sides of the cable guard which are perpendicular to its length are inclined to form a ramp, this type of cable guard is known as a cable ramp. Cable guards come in a variety of sizes from low profile single channel cable guards to modular systems with any number of channels.

Known types of cable guard have been designed to provide a safe and robust housing for cables which prevent damage to the cables and reduce the risk of a person tripping and of the cables moving from the position where they have been laid.

SUMMARY OF THE INVENTION

It is an object of the present invention to provide an improved cable guard which may also be called a cable protector or cable ramp.

In accordance with a first aspect of the invention there is provided a cable guard comprising:
 a housing adapted to receive one or more length of cable;
 a cover connected to the housing, the cover allowing access to the housing for placing the cable in the housing; and
 a locking mechanism for securing the length of cable inside the housing.

Preferably, the housing comprises one or more channels adapted to receive cable.

Preferably, the housing comprises a base having one or more channels the side walls of which extend outwards from the base and along its length.

Preferably, the one or more channel is shaped to receive a cable.

Preferably, the one or more channel is u-shaped.

Preferably, the locking mechanism secures a cable against longitudinal movement in a channel.

Preferably, one or more of said at least one channels is adapted to receive the locking mechanism.

Preferably, the side walls of one or more of the at least one channels comprises a recess into which the locking mechanism is insertable, for securing a cable in position within the channel.

Preferably, the locking mechanism is a locking block which is fitted around a cable within the channel.

Alternatively, one or more of said at least one channels comprises a locking mechanism. Preferably, the locking mechanism is integrally formed with the channel.

Preferably, the locking mechanism secures the cover to the housing.

Preferably, the locking mechanism comprises a lock and key.

Preferably, the side portions of the housing running in the direction of the channels comprise recessed portions which are adapted to receive the outer portions of the cover.

Preferably, the locking mechanism releasably connects at least one of the recessed portions to the corresponding outer portions of the cover.

Optionally, the locking mechanism releasably connects the recessed portions to the corresponding outer portions of the cover on both sides of the housing.

Preferably, the lock comprises a shaped cavity which extends through the recessed portion of the housing and a shaped hole in the cover and a coupling member which is releasably connected between the cavity and the hole by means of a key.

Preferably, the coupling member is a locking pin.

Preferably, the housing is made from moulded polyurethane.

Preferably, the cover is made from moulded polyurethane.

Preferably, the locked cover conceals the position of the recesses and the associated locking mechanism.

Preferably, the locking mechanism comprises:
 a longitudinal rod channel which extends along the length of the housing, the channel being adapted to receive a rod;
 one or more locking pin hole which extends vertically through the cover into the top of the housing and is adapted to receive a locking pin such that the longitudinal rod channel and the locking pin hole intersect;
 wherein, upon insertion of the locking pin and the longitudinal rod, these members effect a lock which retains the cover in a closed position.

Preferably, the rod has an abutting section with an abutting surface which is rotatable so that it extends into the pin hole and into engagement with a recessed surface on the locking pin.

Preferably, the abutting surface is curved.

Preferably, the abutting section has a substantially semi-circular cross section.

Preferably the recessed surface has a substantially semi-circular cross section.

BRIEF DESCRIPTION OF THE DRAWINGS

The present invention will now be described with reference to the accompanying drawings in which:

FIG. 3 is a side view along lines A-A' showing internal features of the housing of the cable guard of FIGS. 1 and 2;

FIG. 4 is a front view of the cable guard of FIGS. 1 to 3;

FIG. 5 is a detailed side view of the locking mechanism of FIG. 4;

FIGS. 6a to 6c show an example of a locking pin used in the locking mechanism of FIG. 5;

FIG. 12 is a side view of a locking pin in accordance with the present invention;

DETAILED DESCRIPTION OF THE DRAWINGS

The present invention relates to an improved cable guard.

Figure 1:
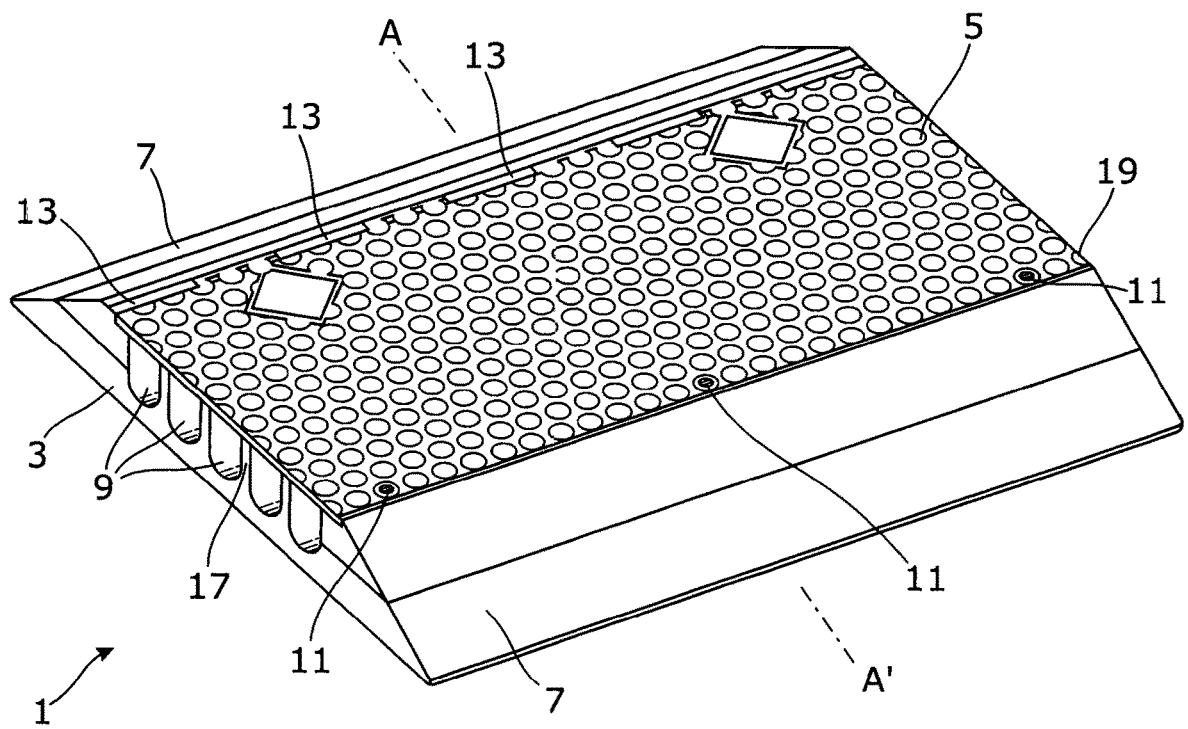
FIG. 1 is a perspective view showing the top of a cable guard in accordance with the present invention.

FIG. 1 is a perspective view showing the top of a cable guard in accordance with the present invention. The cable guard 1 comprises a housing 3 which forms the lower part of the cable guard 1 and which is in contact with the ground in use. A cover 7 extends across the top of the housing 3 to enclose a plurality of channels. In this example of the present invention, five channels are shown extending upwards from the base 4. In this example of the present invention, the cover 5 is connected to the housing 3 by a set of hinges 13 which are spaced along the length of one side of the cover and are coupled to the housing 3 in a recess 43 (FIG. 4). A similar recess 43 extends along the opposing side of the housing and the free end 19 of the cover 5 abuts against this recess so that the top surface of the cover is substantially flush with the top edge 20 of the housing.

The channels 9 extend along the length of the cable guard 1 and are parallel to one another. The channels 9 are shaped to accommodate a cable which means they are generally semicircular or u-shaped in profile. The side portions of the cable guard are angled to extend from the top edge 20 to the bottom surface forming a ramp which makes it easier for pedestrians and vehicles to cross over the cable guard.

Figure 2:
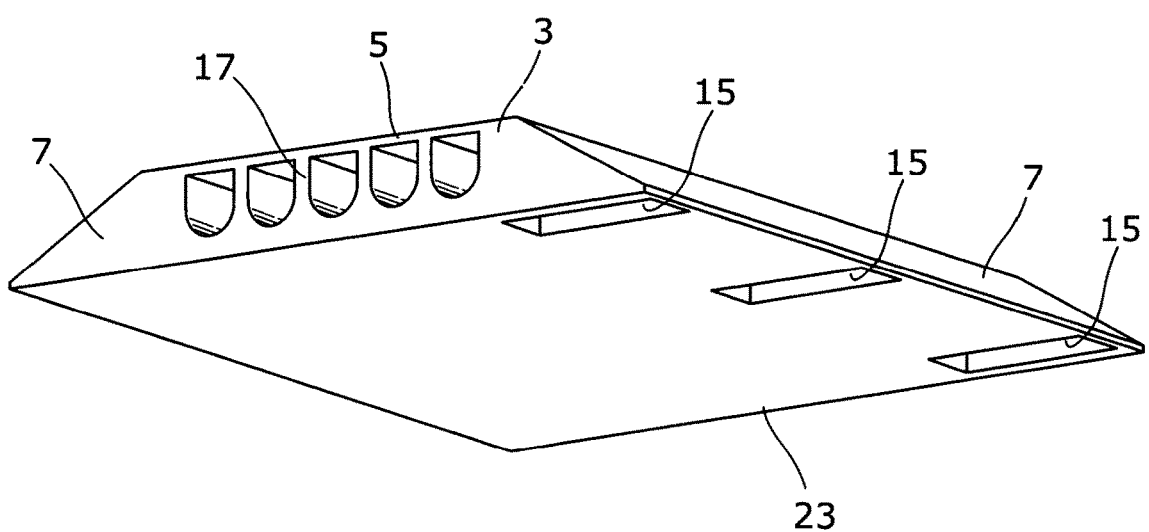
FIG. 2 is a perspective view showing the bottom of a cable guard in accordance with the present invention.

FIG. 2 is a perspective view showing the bottom of a cable guard in accordance with the present invention. In this figure the bottom surface 23 of the cable guard 1 is shown along with openings 15 which extend through the housing 3 and contain the lower part of the locking pin 59 (FIG. 6a). In this example of the present invention, the cavities 15 are formed in the process of creating the housing in a mould.

FIG. 3 is a side view 31 along lines A-A' showing internal features of the housing of the cable guard of FIGS. 1 and 2. The ramp 7 is shown and three cavities 15 are shown positioned along the length of the cable guard. The keyhole 11 extends through the cover and is aligned with a shaped cavity 35 which extends through the housing 3 into the opening 15. This is the locking mechanism which secures the cover 5 to the housing 3 which prevents the cover from being opened without a suitable key.

FIG. 3 also shows part of the second locking mechanism in the form of the channel locking recesses 33. These recesses are aligned in pairs at one or more point along a channel as will be described in more detail with reference to FIGS. 8 and 9 below.

FIG. 4 is a front view 41 of the cable guard of FIGS. 1 to 3. This figure shows the housing 3, the cover 5 which is flush with the housing top edge 20 and which rests upon the recessed portion of the housing 43. The inclined shape of the ramps 7 at the side of the device is shown extending downwards from the top edge 20 to the bottom surface 23. The cover locking mechanism is shown in FIG. 4 and in more detail in FIG. 5. This comprises a shaped cavity 35, which extends through the housing 3 to the opening 15 into which the locking pin 37 may be inserted.

FIGS. 6a to 6c show an example of a locking pin 37 for use in an example of a cable guard in accordance with the present invention. The locking pin 37 comprises a substantially circular head 53 which has two key engaging holes 55, a shaft 57 projects perpendicularly outwards from the head 53 and further comprises two laterally extending arms 59 positioned at or near the end of the shaft remote from the head.

Figure 7:
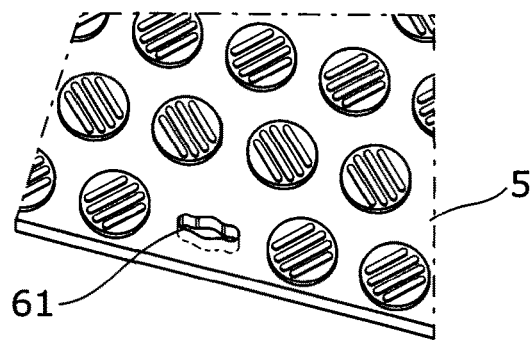
FIG. 7 shows part of the cover as shown in FIG. 1.

It will be appreciated from this figure and FIGS. 6a to 6c that the cavity must be shaped to allow the laterally extending arms 59 of the locking pin to extend through the cavity to secure the cover 5 to the housing 3. As can be seen in FIG. 5, the cavity 35 is in alignment with a similarly shaped hole in the cover through which the pin 37 is inserted. The hole 51 in the cover 5 is also shown in FIG. 7.

Figure 8:
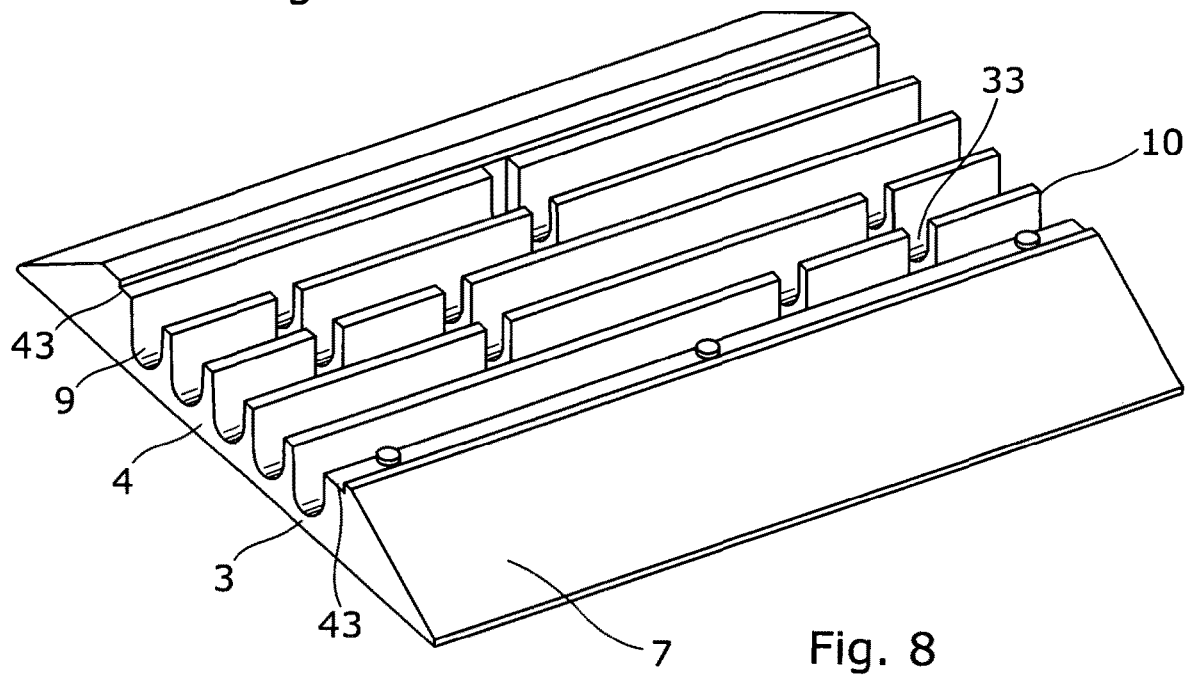
FIG. 8 is a perspective view showing the top of the housing of the cable guard of FIG. 1.

FIG. 8 is a perspective view showing the top of the housing 3 of the cable guard of FIG. 1. The figure shows the housing 3 with channels 9 formed by side walls 10 projecting upwards from the base 4. In this example of the invention, five channels are shown. Each of the walls 10 has a recess 33; recesses on adjacent walls are aligned such that a locking block 65 (FIG. 9) is insertable into the channels and abut against the recesses 33. It will be noted that the recesses 33 for different channels are offset, this allows the locking block to abut against both side walls 10 for each channel.

Figure 9:
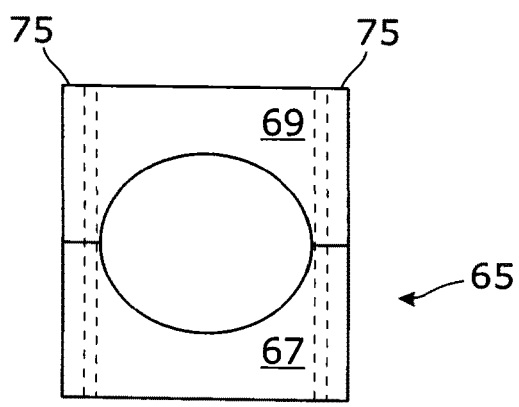
FIG. 9 shows a locking block for insertion in the channel recess to prevent cable movement along the length of the channel.

The locking block shown in FIG. 9 comprises a lower portion 67 and an upper portion 69. A cable receiving space 71 is shaped to fit snugly around the cable and is secured tightly in place around the cable by means of locking bolts which extend through bolt holes 73. The outer edges 75 of the locking block slot into and abut against the recesses 33, in use.

In use, an installer is provided with a plan of where cables are to be laid and where the route of the cables crosses an area where protection is required; this could be protection from vehicular traffic or for health and safety reasons. The cable guard 1 is positioned on the ground, a locking blocks 65 is fitted loosely to a cables and the cable placed in the channel. Next, the position of the locking block 65 is adjusted so that it fits inside the recess 33 and the locking bolts are tightened to securely attach the locking block 65 to the cable when it is in position. This is repeated for all of the channels 9 through which the cables run. It will be appreciated that this locking mechanism secures a cable in a channel, preventing it from being pulled out along the length of the channel.

Once the cables are securely fixed within the channel, the cover 5 is closed on top of the housing 3 where it rests upon the recessed portion of the housing 43. A further advantage of the present invention is that the locked cover conceals the position of the recesses 33 and the associated locking blocks.

A locking pin is inserted through the key hole 51 and in through the shaped cavity 35. A key is used to turn the locking pin 51 so that the laterally extending arms 59 abut against the upper surface of the opening 15, thereby preventing the cover 5 from being lifted upwards from the housing to prevent access to the cables within the channels 9.

It is noted that known cable guards provide a suitable means for protecting cables from the weight of vehicles which may need to travel over the top of the cables and also reduce the risk that the cables may be moved or be a trip hazard.

However, another problem associated with the use of heavy duty cables is that it is very expensive, costing around £16/m. As a consequence theft of such cables, however risky and dangerous is a significant and costly problem. Also, because the cables are often used at outdoor events in public spaces such as parks, it is not practically possible to lock up or guard an entire length of cable which may be hundreds of meters long.

Currently a person wishing to steal a length of cable must risk injury or death by cutting through a potentially live high voltage cable then gather in the length of cable on a reel. In situations where a portion of the cable is positioned in a known type of cable guard, the cable may simply be removed from the cable guard by opening the lid and lifting the cable out. Alternatively, once a cable has been cut, it can be pulled out from a known type of cable guard along the length of the channel.

Figures 10A, 10B:
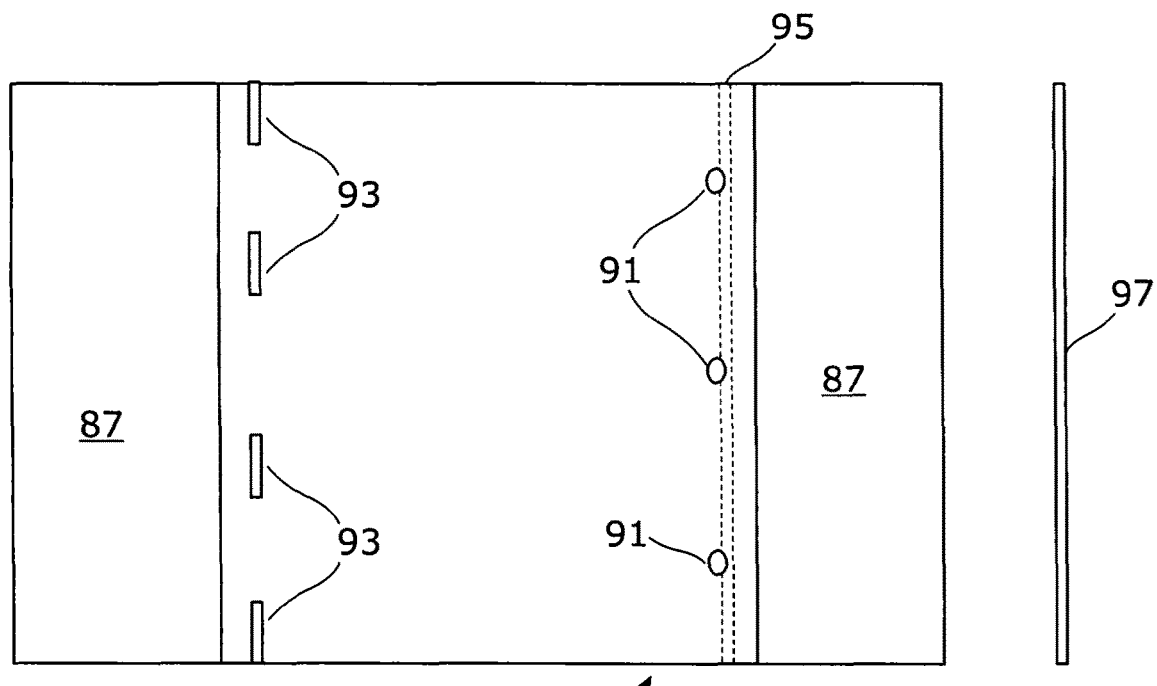
FIG. 10a is a plan view of another embodiment of a cable guard in accordance with the present invention and FIG. 10b is a plan view of a longitudinal rod.

In use, the present invention reduces the likelihood of cable theft by locking the cable inside the cable guard. In a preferred embodiment, the cover of the cable guard is locked to prevent access to the cable and the cables are locked in position in the channels of the cable guard. The present invention greatly increases the time and effort required by a thief who wishes to steal a significant length of cable by forcing them to break or unlock the cable guard before the cable can be taken away. Such activities increase the risks associated with cable theft and make it a less attractive proposition. Another embodiment of the present invention is shown in FIGS. 10 to 14. FIG. 10a is a plan view 81 of a cable guard which has a housing 83 positioned below the cover 85 with two ramp sections 87 positioned, one at each side of the gable guard. Hinges 93 are shown towards one side of the cable guard and locking pin holes 91 are shown near the free side of the cover, remote from the hinges and extend vertically from the cover, through the cover 85 into the housing 83 of the cable guard. The longitudinal rod channel 95 is substantially circular in cross section and is positioned in the body of the housing below the locking pin holes 91 and extends along the length of the cable guard. The pin holes and the longitudinal rod channel 95 intersect as shown in the figure to allow the longitudinal rod and locking pin to be coupled together and lock in place. The longitudinal rod 97 is shown generally in FIG. 10b.

Figures 11, 12A, 12B, 13:
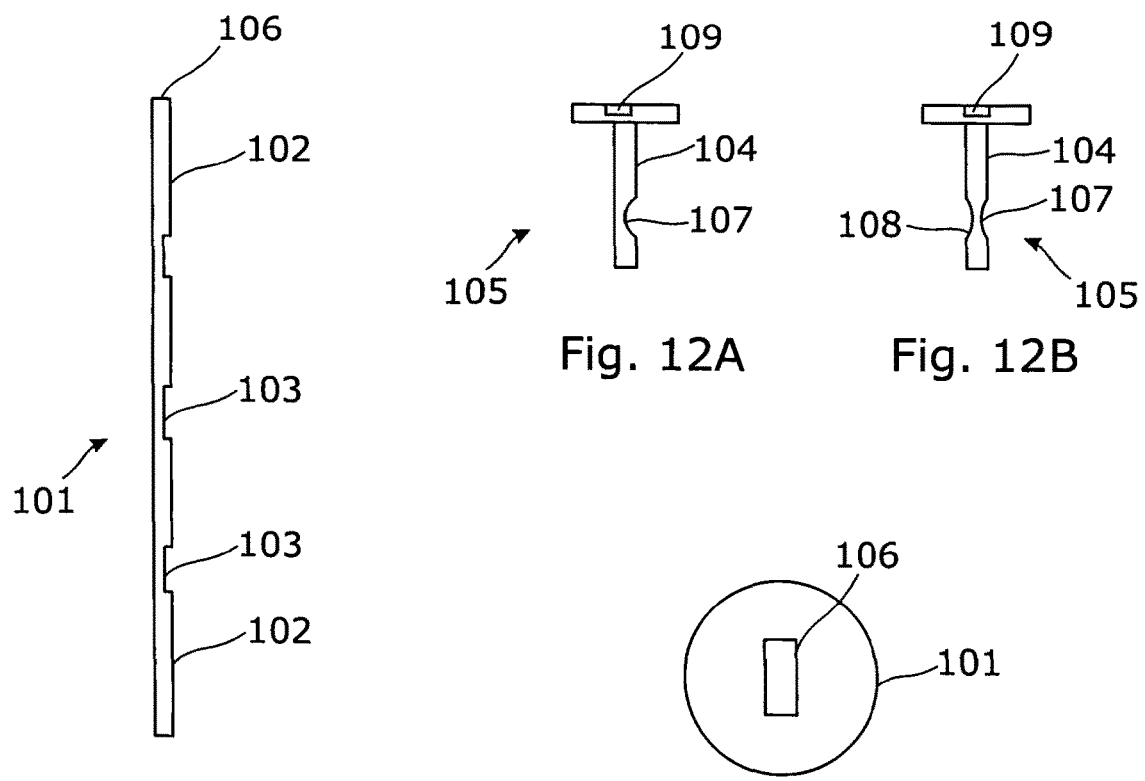
FIG. 11 is a detailed view of a longitudinal rod as used in the present invention.
FIG. 13 is an end view of a locking rod in accordance with the present invention.

FIG. 11 shows an embodiment of the longitudinal rod 101. Sections along the length of the rod 101 have a substantially circular cross section 102 whilst other sections along the length of the rod 103 have a substantially semi-circular cross section. The sections of the rod with a substantially semi-circular cross section 103 are positioned along the length of the rod to coincide with the positions of the locking pin holes 91 (FIG. 10a) when the rod 101 is fully inserted into the longitudinal rod channel 95.

FIG. 12a shows an example of a locking pin 105 comprising a shaft 104 and a head 108. The shaft has a recessed section 107 on one side of the shaft which is positioned along the length of the pin 105 to coincide with the position of the longitudinal rod channel 95 when the locking pin is fully inserted into the locking pin hole 91. In the embodiment of FIG. 12B, a second recessed section 108 is positioned opposite the first, this reduces the need to turn the pin in the locking pin hole because it will either be correctly orientated or will move into the correct orientation when the longitudinal rod 101 is inserted.

The head has a keyhole adapted to receive a key for turning the locking pin 105 to adjust its position when it is in the pin hole 91. In some cases a key may not be required when the locking pin is in the correct orientation within the hole 91.

FIG. 13 is an end elevation of the longitudinal rod 101 of FIG. 11. The end of the rod has a key hole 106 into which a key may be inserted in order to turn the rod 101.

Figure 14A:
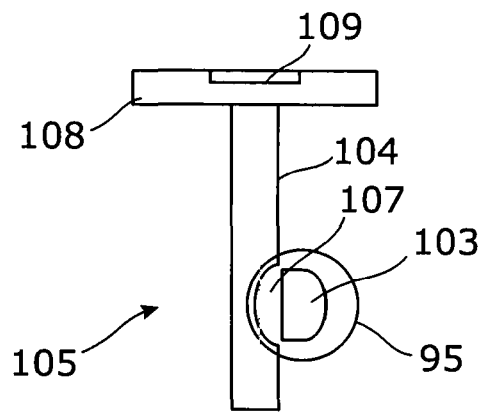
FIGS. 14a and 14b are end views of the longitudinally extending rod and locking pin in their unlocked and locked configurations.
Figure 14B:
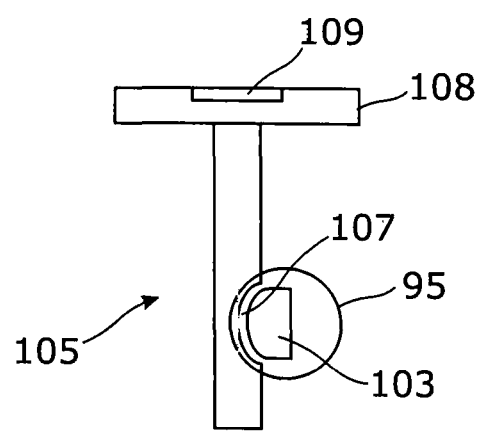

FIGS. 14a and 14b show the locking mechanism provided by the features shown in FIGS. 10 to 13. The locking pin 105 is fully inserted into the locking pin hole (91, FIG. 10a, not shown) and orientated such that the recess 107 is facing in to the longitudinal channel 95. The longitudinal rod is fully inserted into the longitudinal channel 95 such that the recessed areas 103 of the rod are positioned in the locking pin hole 91 where it intersects with the longitudinal channel 95. As seen in FIG. 14a, the recessed section 103 is positioned such that the curved portion of it is facing away from the recess 107 such that both locking pin 105 and rod 101 are freely insertable and removable. FIG. 14b shows the rod 101 having been rotated such that the curved portion of the recessed section 103 is facing towards the recess 107 such that it abuts against the recess of the pin 105 preventing removal of the pin and rod 101. The head of the pin 108 is held in place upon the cover 85 therefore this mechanism locks the cover 85 in place.

Improvements and modifications may be incorporated herein without deviating from the scope of the invention.

The invention claimed is:

1. A cable guard comprising:
   a housing which comprises one or more cable receiving channels;
   a cover connected to the housing, the cover allowing access to the one or more cable receiving channels;
   a locking mechanism for securing a length of cable inside the housing wherein, the locking mechanism secures a length of cable which has been placed in the channel against longitudinal movement along the channels;
   wherein, the locking mechanism further comprises a lock configured to secure the cover to the housing, the housing comprises side portions which run in the longitudinal direction of the channels and which comprise recessed portions which are adapted to receive the outer portions of the cover, the locking mechanism configured to releasably connect at least one of the recessed portions to the corresponding outer portions of the cover; and
   wherein one or more of said at least one channels is adapted to receive the locking mechanism.

2. The cable guard as claimed in claim 1 wherein, the housing comprises a base having one or more channels the side walls of which extend outwards from the base and along its length.

3. The cable guard as claimed in claim 2 wherein the side walls of one or more of the at least one channels comprises a recess into which the locking mechanism is insertable, for securing the length of cable in position within the channel.

4. The cable guard as claimed in claim 1 wherein, the locking mechanism is a locking block which is fitted around a cable within the channel.

5. The cable guard as claimed in claim 1 wherein, the locking mechanism is integrally formed with the channel.

6. The cable guard as claimed in claim 1 wherein, the locking mechanism releasably connects the recessed portions to the corresponding outer portions of the cover on both sides of the housing.

7. The cable guard as claimed in claim 1 wherein, the lock comprises a shaped cavity which extends through a recessed portion of the housing and a shaped hole in the cover and a coupling member which is releasably connected between the cavity and the hole by means of a key.

8. The cable guard as claimed in claim 7 wherein, the coupling member is a locking pin.

9. The cable guard as claimed in claim 1 wherein, the housing is made from moulded polyurethane.

10. The cable guard as claimed in claim 9 wherein, the cover is made from moulded polyurethane.

11. The cable guard as claimed in claim 1 wherein, the locking mechanism comprises:

a longitudinal rod channel which extends along the length of the housing, the longitudinal rod channel being adapted to receive a rod;

one or more locking pin hole which extends vertically through the cover into the housing and is adapted to receive a locking pin such that the longitudinal rod channel and the locking pin hole intersect;

wherein, upon insertion of the locking pin and the longitudinal rod, these members effect a lock which retains the cover in a closed position.

12. The cable guard as claimed in claim 11 wherein, the rod has an abutting section with an abutting surface which is rotatable so that it extends into the pin hole and into engagement with a recessed surface on the locking pin.

13. The cable guard as claimed in claim 11 wherein, the abutting surface is curved.

14. The cable guard as claimed in claim 11 wherein, the abutting section has a substantially semicircular cross section.

15. The cable guard as claimed in claim 11 wherein the recessed surface has a substantially semicircular cross section.

* * * * *